United States Patent [19]

Leonard et al.

[11] Patent Number: 4,667,985

[45] Date of Patent: May 26, 1987

[54] BANK CHECK FORM

[75] Inventors: Robert E. Leonard, Miamisburg; Robert E. Huser, Dayton, both of Ohio

[73] Assignee: NCR Corporation, Dayton, Ohio

[21] Appl. No.: 834,726

[22] Filed: Feb. 28, 1986

[51] Int. Cl.[4] ........................ B42D 15/00; B32B 7/00; B32B 9/00

[52] U.S. Cl. ........................................ 283/58; 283/73; 428/335; 428/311.3

[58] Field of Search ................. 283/58, 73; 235/3, 17; 101/24; 428/311.3, 335

[56] References Cited

U.S. PATENT DOCUMENTS

| | | | |
|---|---|---|---|
| 1,465,531 | 8/1923 | Smith et al. | 283/58 X |
| 1,504,181 | 8/1924 | Borland | 283/58 |
| 1,621,457 | 3/1927 | Bullock | 283/58 |
| 3,048,426 | 8/1962 | Rodriguez et al. | 283/58 |
| 3,169,186 | 2/1965 | Howard | 283/58 |
| 4,025,455 | 5/1977 | Shackle | 428/311.3 |
| 4,114,033 | 9/1978 | Okamoto et al. | 235/494 |
| 4,143,890 | 3/1979 | Davis et al. | 428/335 |
| 4,408,121 | 10/1983 | Galatha | 235/494 |
| 4,430,563 | 2/1984 | Harrington | 235/494 |

*Primary Examiner*—Paul A. Bell
*Assistant Examiner*—Paul M. Heyrana
*Attorney, Agent, or Firm*—Wilbert Hawk, Jr.; Albert L. Sessler, Jr.; George J. Muckenthaler

[57] ABSTRACT

A bank check or like instrument has a marking area at the right side thereof which includes a plurality of rows and columns of blocks for receiving marks. The combination of the marked blocks represents a dollars and cents amount. The contiguous area adjacent the rows and columns of blocks is coated with wax to prevent marking outside the boundaries of the blocks.

12 Claims, 1 Drawing Figure

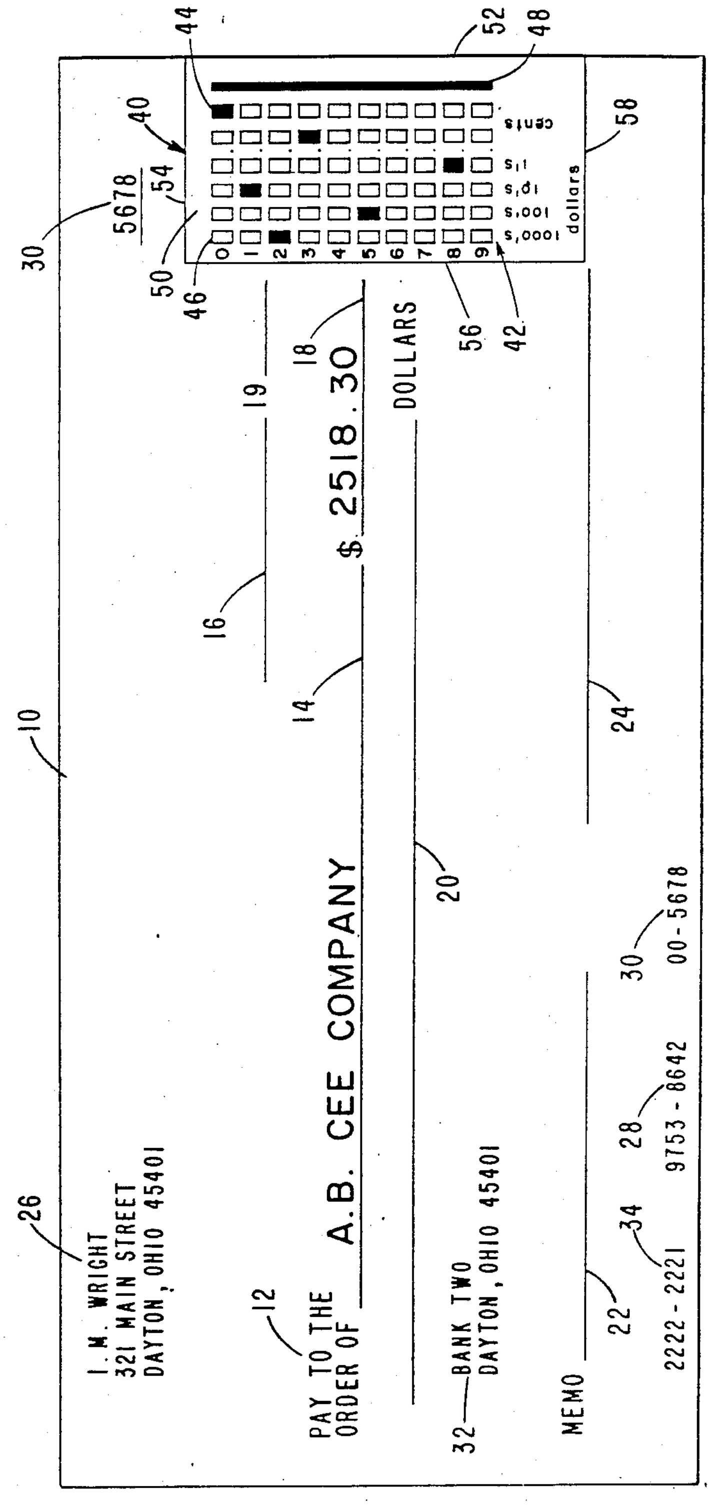
I.M. WRIGHT
321 MAIN STREET
DAYTON, OHIO 45401
5678
PAY TO THE ORDER OF
A.B. CEE COMPANY
$ 2518.30
DOLLARS
BANK TWO
DAYTON, OHIO 45401
MEMO
2222-2221
9753-8642
00-5678
cents
dollars

BANK CHECK FORM

BACKGROUND OF THE INVENTION

In the field of business forms and more specifically relating to bank checks or like forms, there has been increased activity to provide fast and accurate processing of the tremendous numbers of such checks flowing daily throughout the banking system. As is well known, the widely used bank check is dated, includes a line for the name of the payee, a rectangular block or like area to contain the amount of the check in numerals, a line to enable the written amount of the check, and a line for the signature of the maker of the check.

While the rectangular block or like area is seen to be a significant advance in the design of a bank check for aid in processing such check, it must be realized that differences in the form and style of the numerical amount requires extensive processing equipment. In the case of encoding equipment, the bank number and the account number of the maker of the check may be in the form to enable machine reading of the numbers. The amount of the check is read therefrom and is then printed on a journal or like tape in order to have a record of the check amount subsequent to the processing operation. It is, therefore, desirable to provide a bank check or like form which is readily accepted by encoding or like reading equipment in the fast and accurate processing of the check.

Representative documentation in the field of bank checks or like forms includes U.S. Pat. No. 4,114,033, issued to A. Okamoto et al. on Sept. 12, 1978, which discloses a bar code information card wherein a plurality of bar codes are recorded in dual directions, one direction being orthogonal to the bar symbol and the other being in the direction in which the bar symbol extends.

U.S. Pat. No. 4,408,121, issued to M. J. Galatha on Oct. 4, 1983, discloses a code format for bank check identification which has marking elements of two distinctive lengths which lie across a set of parallel equal height code zones. The longer of the two lengths exceeds the length of the shorter by twice the height of a code zone.

U.S. Pat. No. 4,430,563, issued to J. A. Harrington on Feb. 7, 1984, discloses a data processing form having darkened areas which establish a row and column format with an elongate edge mark for each row. Some of the darkened areas are to be filled in the user of the form.

SUMMARY OF THE INVENTION

The present invention relates to bank check forms. More particularly, the invention provides a bank check of desired size and shape that includes a marking area at the right side thereof having rows and columns of blocks or like areas for receiving marks entered by the user of the check. The combination of the marked blocks or areas represents a dollar and cents amount in numerical format. The contiguous area adjacent and surrounding the rows and columns of blocks is coated with wax or like material to prevent marking outside the several blocks.

The wax or like material comprises a non-ink receptive coating surrounding the marking blocks on the face of the check which deters marking outside the blocks, but which provides a defined area for marking one or more of the blocks to represent a numerical amount. The wax includes an encapsulated dye that preferably is of a color not readable by machine-type readers, but which will show as a smudge whenever the originally marked blocks appear to have been changed.

In accordance with the above discussion, the principal object of the present invention is to provide a code format on the face of a bank check or like instrument.

Another object of the present invention is to provide a marking area on the face of a bank check for use by the maker or author of the check.

An additional object of the present invention is to provide a plurality of marking areas arranged in row and column format for receiving marks entered by the user of the check.

A further object of the present invention is to provide a coating on the face of the bank check and surounding the marking blocks for effectively containing the marking within the blocks.

Additional advantages and features of the present invention will become apparent and fully understood from a reading of the following description taken together with the annexed drawing.

BRIEF DESCRIPTION OF THE DRAWING

The single FIGURE is an enlarged top plan view of a bank check or like instrument incorporating the subject matter of the present invention.

DESCRIPTION OF THE PREFERRED EMBODIMENT

A bank check or like instrument or form 10 in the shape of a rectangle carries printing, as at 12, on the face of the check along with appropriately spaced lines for use by the maker or author of the instrument. A line 14 is provided to fill in the name of the payee and a line 16 is available for the date. A line 18 is used for the numerical dollar-and-cents amount and a line 20 carries the written or spelledout amount. A memo line 22 and a signature line 24 are common and well-known features on the face of the check 10. Additionally, the name and address 26 and the account number 28 of the maker of the check 10, along with the check number 30 are printed on the check. The bank name 32 and bank number 34 are also printed on the face of the check 10 to complete the features thereof.

At the right side of the check 10 is an area 40 of rectangular shape in which a plurality of small rectangular blocks 42 are placed in row and column format. It is seen that new rows of blocks 42 and six columns of the blocks occupy a portion of the area 40 with certain of the blocks representing dollar amounts and others of the blocks representing cents. The two right columns 44 of blocks 42 are coded for cents figures and the four left columns 46 of blocks are coded for dollar figures, ranging from one dollar ($1.00) to one thousand dollars ($1,000.00). A long rectangular area 48 is provided at the right side of the marking blocks 42 and may be encoded with magnetic or other material for initiating or indicating start of a reading operation.

The portion 50 of area 40, and as outlined by the right hand edge 52 and the lines 54, 56 and 58, not occupied by the marking blocks 42, is coated with a wax formulation employing a hot melt wax process. A wax formulation employing a hot melt wax process and appropriate for use with the present invention is disclosed in U.S. Pat. No. 4,025,455 which discloses a process for forming microcapsules using a cross-linked hydroxypropylcellulose aqueous solution and an oil solution. U.S. Pat. No. 4,143,890, discloses a use or application of the microcapsules employing such hot melt wax process and including a solvent-free, non-aqueous, hot melt suspending medium and an encapsulated chromogenic material dispersed therein. Of course, other wax formulations or other processes may be used for the coating surrounding the marking blocks 42. The coating is non-ink receptive and, in effect, is printed or spot coated on the mark-sense patch or area 40 in a manner wherein the marking blocks are free of wax and are thus receptive to ink or other marking material applied therein. Within the coated area, the surface is printed with an encapsulated dye which is not readable by a reader or scanner of the type that is appropriate for reading the marking blocks 42. The dye capsules will be receptive and smudging will occur whenever the original mark sense characters (the marked blocks) are tampered with or changed.

It is thus seen that herein shown and described in a bank check form or the like which includes a marking area of rows and columns of blocks that represent numerical amounts when such blocks are filled in by the maker or author of the instrument. The bank check form of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof are to be construed in accordance with the following claims.

What is claimed is:

1. A bank form having marking indicia thereon acceptable for machine reading and comprising a
   substrate of generally rectangular shape and including machine readable printed information thereon designating identification of a bank and a customer thereof,
   space on the bank form for recording a money amount in numerical and in written form,
   said marking indicia including a plurality of marking areas arranged in row and column form representing the money amount for marking by the customer, the marking areas being surrounded by means non-receptive to marking, and
   means adjacent the plurality of marking areas for indicating the start of a marking area reading operation.

2. The bank form of claim 1 comprising a bank check.

3. The bank form of claim 1 wherein the plurality of marking areas comprise rows and columns of rectangles disposed at the right side of the form and said start indicating means comprises an elongated rectangle adjacent said rows and columns of rectangles at the right side of the form.

4. The bank form of claim 1 wherein the marking areas are surrounded by a wax coating non-receptive to marking.

5. The bank form of claim 4 wherein the wax coating includes particles of encapsulated dye.

6. The bank form of claim 1 wherein the plurality of marking areas are arranged in rows and columns and represent the dollars and cents amount entered in numerical and in written form in the space provided therefor when the marking areas are marked by the customer.

7. In a bank form having a generally rectangular shape and including printed information thereon designating identification of the bank and a customer thereof, and space on the form for recording a money amount in numerical form, the improvement comprising
   means on the face of the bank form including a plurality of marking areas representative of the money amount and so marked by the customer for machine reading, the marking areas being surrounded by mans non-receptive to marking, and means adjacent the plurality of marking areas for indicating start of a reading operation.

8. In the bank form of claim 7 wherein the form comprises a bank check.

9. In the bank form of claim 7 wherein the plurality of marking areas are arranged in row and column format.

10. In the bank form of claim 7 wherein the plurality of marking areas comprise rows and columns of rectangles and said start indicating means comprises an elongated rectangle disposed at the right side of the form.

11. In the bank form of claim 7 wherein the marking areas are surrounded by a wax coating non-receptive to marking.

12. In the bank form of claim 11 wherein the wax coating includes particles of encapsulated dye.

* * * * *